(12) United States Patent
Eberhart et al.

(10) Patent No.: US 6,366,080 B1
(45) Date of Patent: Apr. 2, 2002

(54) SENSOR FOR SENSING ROTARY MOVEMENT INCLUDING A STATIONARY SENSOR UNIT AND A ROTATABLE SENSOR UNIT

(75) Inventors: Eugen Eberhart, Düsseldorf; Christoph Dorr, Schermbeck, both of (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/064,450

(22) Filed: Apr. 22, 1998

(30) Foreign Application Priority Data

Apr. 24, 1997 (DE) ............................................. 197 17 204
May 2, 1997 (DE) ........................................... 197 18 723

(51) Int. Cl.$^7$ ............................................. G01B 7/30
(52) U.S. Cl. ............................. 324/207.22; 324/207.25
(58) Field of Search ................ 324/207.22, 207.25, 324/173, 174, 207.15, 207.16, 207.17, 207.2, 207.21; 310/6.13; 384/448

(56) References Cited

U.S. PATENT DOCUMENTS 3,745,392 A   7/1973  Phoenix et al.
3,772,548 A   11/1973 Wroblewski et al.
3,774,061 A   11/1973 Fiteny et al.
5,503,250 A * 4/1996  Schantz et al. ........ 324/207.25

FOREIGN PATENT DOCUMENTS

| DE | 2054852 | 5/1971 |
| DE | 2324791 | 5/1973 |
| EP | 0443940 | 8/1991 |
| JP | 6109748 | 4/1994 |

* cited by examiner

*Primary Examiner*—Walter E. Snow
(74) *Attorney, Agent, or Firm*—Tarolli, Sundheim, Covell, Tummino & Szabo L.L.P.

(57) ABSTRACT

The present invention is based on the objective of disclosing a rotary sensor arrangement in which the sensor is accessible without having to remove any assemblies, wherein said sensor arrangement also allows an economical integration into existing assemblies. According to the invention, this objective is attained with a rotary sensor arrangement for elements that can be turned relative to surrounding elements, in particular, for shafts, which consists of at least two sensor units that can be mounted separately from one another, wherein one sensor unit is arranged on the rotatable element and at least one second sensor unit is arranged on an element that is stationary relative to the rotatable element, and wherein at least the second sensor unit can be accessed and removed independently of the state of installation of the rotatable element.

18 Claims, 4 Drawing Sheets

Figure 1:
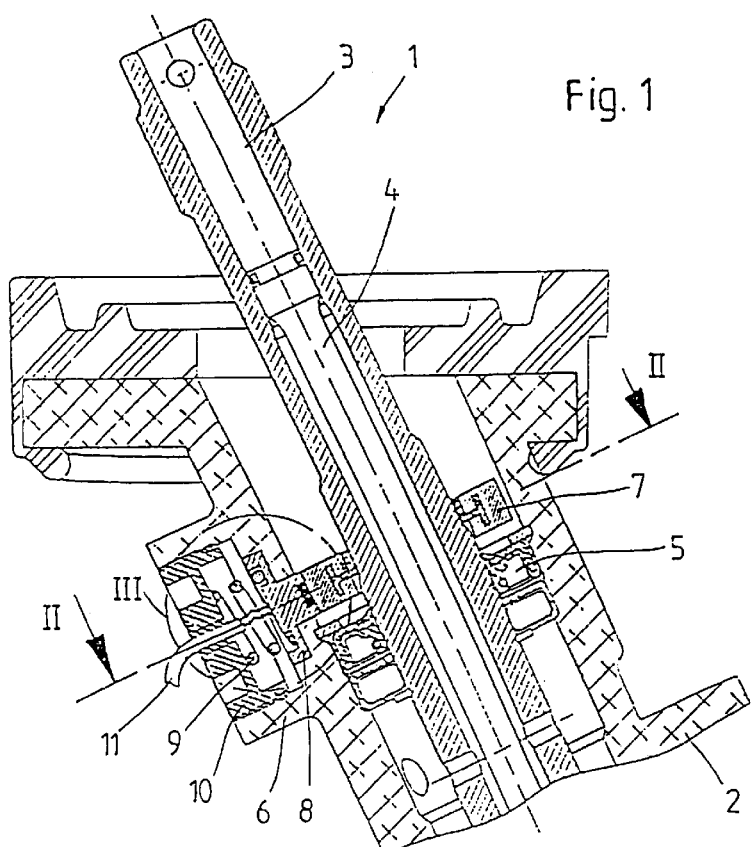

SENSOR FOR SENSING ROTARY
MOVEMENT INCLUDING A STATIONARY
SENSOR UNIT AND A ROTATABLE SENSOR
UNIT

The invention pertains to a rotary sensor arrangement for elements that can be turned relative to surrounding elements, in particular for shafts.

In gear shafts, steering valve shafts, power steering systems and the like, it is necessary to determine the steering angle and, if so required, the steering angle velocity. In modern electrohydraulic steering systems, this information serves for adapting the flow rate of the pump to the given current steering velocity.

Since the available space for auxiliary assemblies, e.g., gears, steering valves and the like, is limited in the manufacture of modern automobiles, for which the present invention is particularly intended, it is necessary to integrate the rotary sensor arrangements into the given assembly. This is also desirable for reasons of minimal manufacturing costs, low assembly expenditures and the like.

Known sensor arrangements usually contain assemblies that can be turned relative to one another. However, these assemblies also form a unit relative to one another, i.e., sensor modules. The main reason for this can be seen in the fact that the assemblies must be arranged relative to one another in a predetermined relation, i.e., with respect to location, direction, spacing and the like. Otherwise, a flawless sensor function with a sufficient accuracy cannot be ensured. One example for such an arrangement are Hall sensor systems, in which a magnetic pulse ring is surrounded by a Hall sensor ring. These rings must maintain a fixed, predetermined distance from one another. Consequently, these rings are preassembled relative to one another and form a sensor module, usually a ball bearing that, for example, is mounted on a shaft. The outer ring is secured from rotating and is electrically connected. One disadvantage of this known sensor module is that the entire shaft assembly must be removed if malfunctions occur, subsequent adjustments must be made, etc., because the sensor would otherwise not be accessible. This removal is particularly undesirable with power steering systems because the entire steering valve and, in certain instances, even the complete steering system must be removed. When using sensor modules with two concentric elements of the previously described type which, for example, are also used in optoelectronic rotary measuring methods, the requirements regarding interchangeability or ease of assembly cannot be fulfilled.

Starting from the state of the art, the present invention is based on the objective of disclosing a rotary sensor arrangement in which the sensor is accessible without having to remove any assemblies, wherein said sensor arrangement also allows an economical integration into existing assemblies.

According to the invention, this objective is attained with a rotary sensor arrangement for elements that can be turned relative to surrounding elements, in particular, for shafts, which consists of at least two sensor units that can be mounted separately from one another, wherein one sensor unit is arranged on the rotatable element and at least one second sensor unit is arranged on an element that is stationary relative to the rotatable element, and wherein at least the second sensor unit can be accessed and removed independently of the state of installation of the rotatable element.

According to the invention, completely different sensor units can be mounted in completely different fashion. In this case, it is essential that at least one sensor unit can be mounted on a relatively stationary element, e.g., a housing, and independently of the state of installation of, for example, a shaft. Consequently, the element is accessible at all times and can be removed independently of the state of installation of the shaft.

The element to be arranged on the rotatable element, e.g., a shaft, may, for example, be realized annularly. This element may, for example, consist of a magnetic pulse ring that is mounted on the input shaft of a steering valve. When carrying out an optoelectronic measurement of the angle of rotation, this element consists of a ring provided with corresponding optical markings. This ring may be mounted at a suitable location on the input shaft so that it surrounds said input shaft. According to one advantageous proposal of the invention, at least the second sensor element is realized analogously to a ring segment, i.e., this sensor element may be arranged on the housing side opposite to the rotatable sensor unit. The ring segment may, for example, contain Hall sensors, optoelectronic sensors or the like.

According to one particularly advantageous proposal of the invention, the sensor units are realized in such a way that they slide on one another. This can be realized in particularly advantageous fashion by arranging a plastic layer on one or both units. A fixed, predetermined distance of the units relative to one another is ensured by the plastic layer formed between the surfaces of the sensor units which face one another, i.e., a highly accurate sensor for shafts that run untrue or for unfavorable deviations of dimensional tolerances is realized. In addition, this measure makes it possible for the sensor units to slide on one another in nearly frictionless fashion.

The sensor unit that is essentially realized in the form of a rod or a ring segment may be mounted on the steering shaft of the steering valve similar to a thrust piece, namely on the housing side at the elevation of the magnetic pulse ring. This sensor unit may be realized in the form of a plastic thrust piece and guided axially and tangentially in the housing. According to one advantageous proposal of the invention, the sensors as well as the evaluation circuit, line connections, plugs and the like are cast into the plastic material. The thrust piece may be mounted and fixed in a housing bore in spring-loaded fashion, preferably by means of a screwed-on cover, a clipped-on cover or a similar arrangement, wherein a helical spring is preferably arranged in between. The sensor may be connected to a thrust piece by means of parallel, essentially linear spring elements. Consequently, the spring elements fulfill the guide function and realize the electrical connection. Alternatively, a cover with membrane function, i.e., an elastic cover, may be used. Due to these measures, the thrust piece is guided and spring-mounted, wherein the housing is simultaneously sealed by the cover.

According to one particularly advantageous proposal of the invention, the rotary sensor arrangement according to the invention is arranged in a steering gear, in particular, on the steering valve. In this case, the input shaft of the steering valve is provided with a magnetic pulse ring, and the Hall sensors are cast into a plastic thrust piece that is arranged in a bore in the steering gear housing.

Consequently, the invention also discloses a completely new type of steering valve or steering gear, wherein said steering valve or steering gear contains a steering sensor arrangement for determining the steering angle, the steering angle velocity and the like. This steering sensor arrangement is formed by a pulse transmitter attached onto the input shaft and a sensor arrangement arranged on the side of the gear housing. The steering gear according to the invention preferably contains a Hall sensor arrangement that is mounted in the housing opposite to the magnetic pulse ring that is attached onto the input shaft. The Hall sensor arrangement preferably consists of a plastic thrust piece, into which the Hall sensors, the evaluation circuit, the connecting lines and the like are cast. The plastic thrust piece is prestressed by a spring that is subjected to tension by a screwed-on cover, a clipped-on cover or the like.

The invention allows compensation of tolerances. For this purpose, a very wide pulse ring that is arranged opposite to a narrow Hall sensor thrust piece may, for example, be used. The Hall sensor thrust piece may also contain an axial limit stop for the pulse ring. One of the sensor units may be realized integrally with the shaft or the housing. The pulse ring, in particular, may be realized integrally with the shaft or be directly integrated into this shaft. This applies analogously to the thrust piece and the housing.

Figure 3:
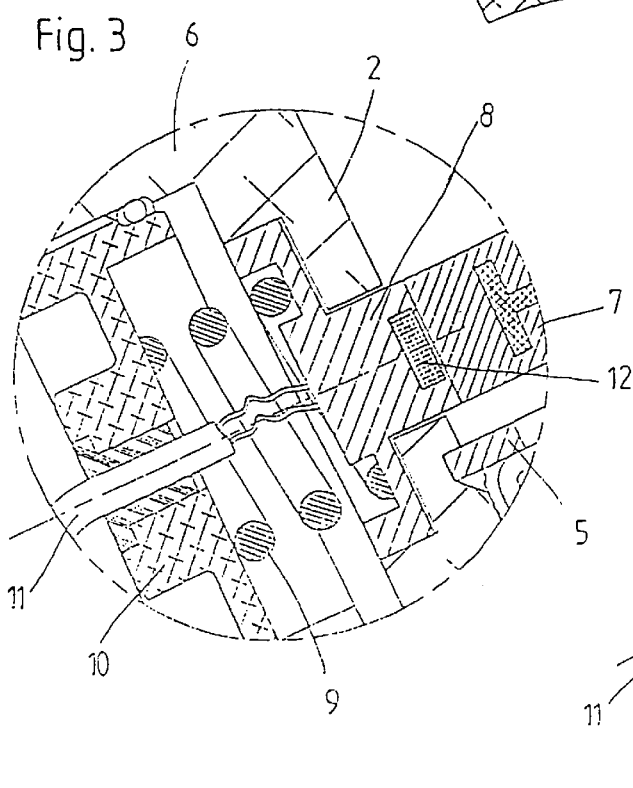
Figure 2:
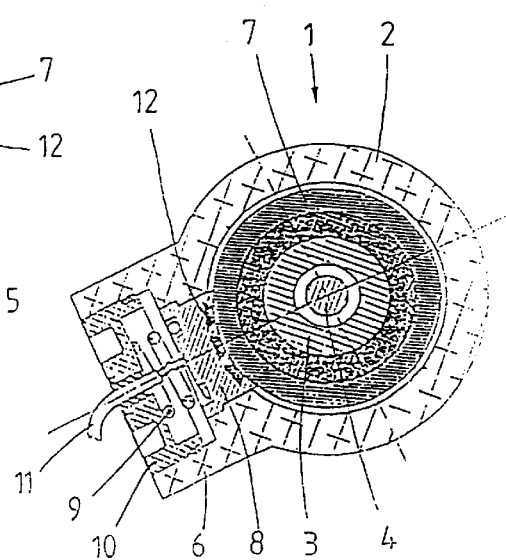
Figure 4:
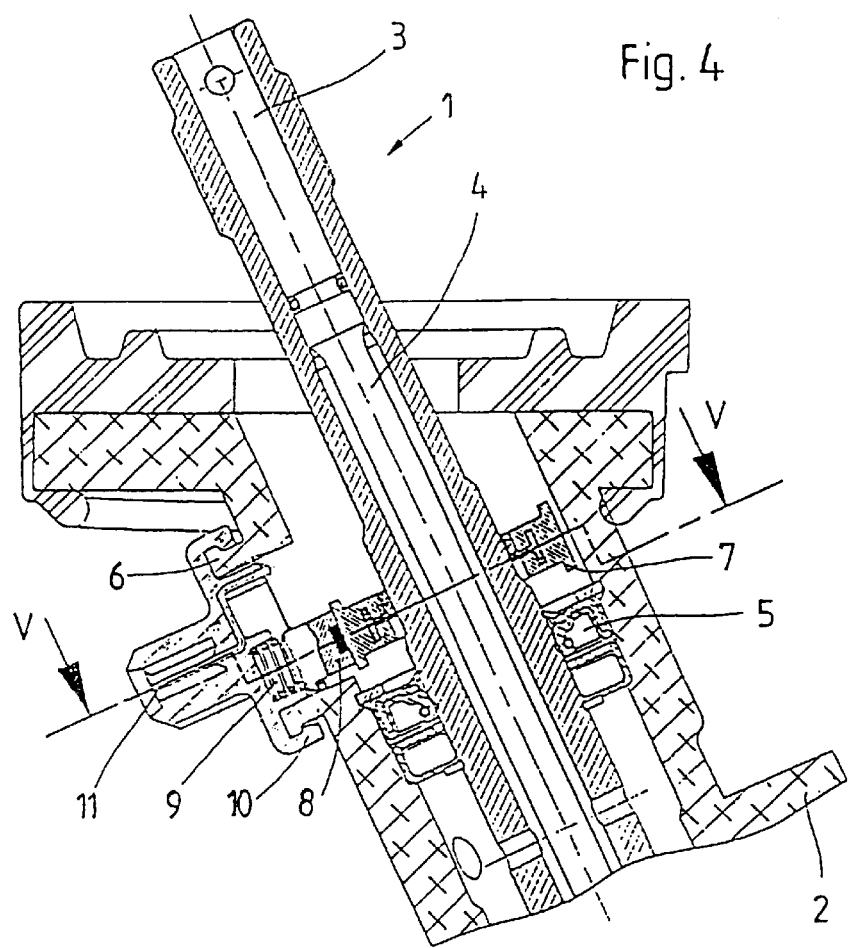
Figure 5:
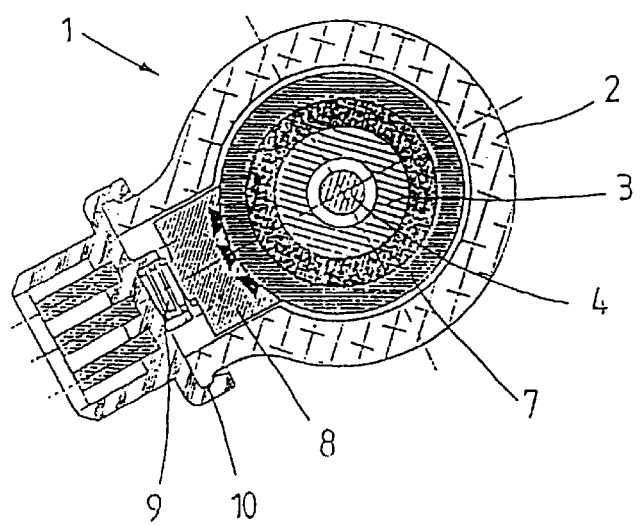
Figure 6:
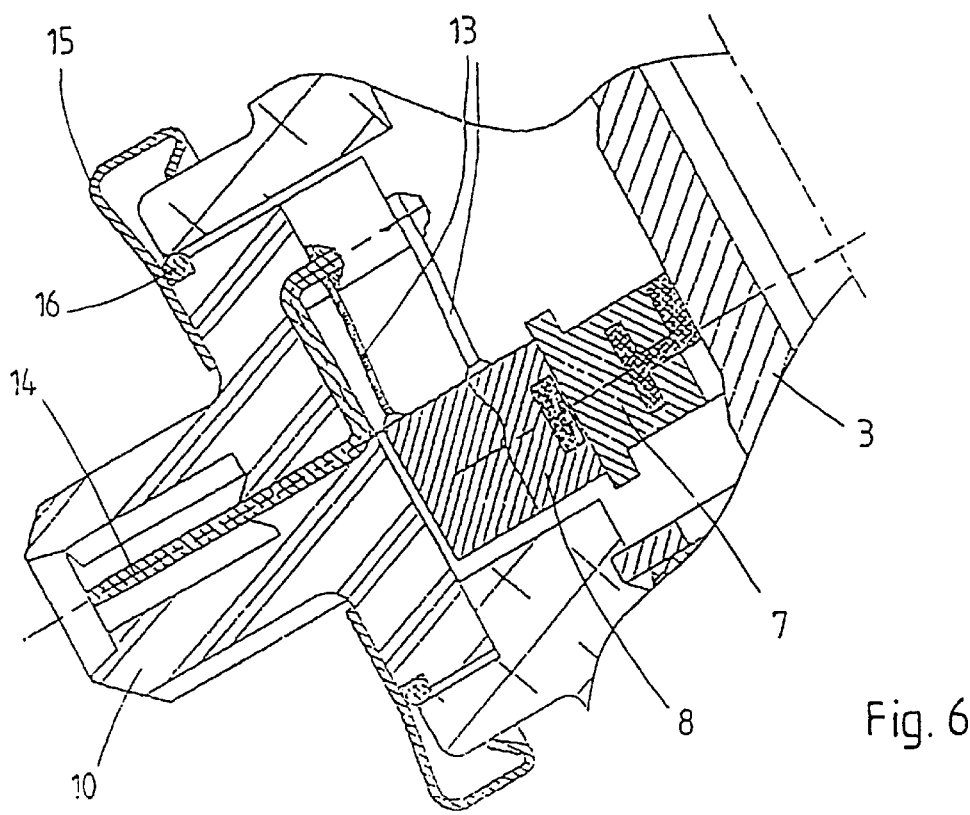
Figure 7:
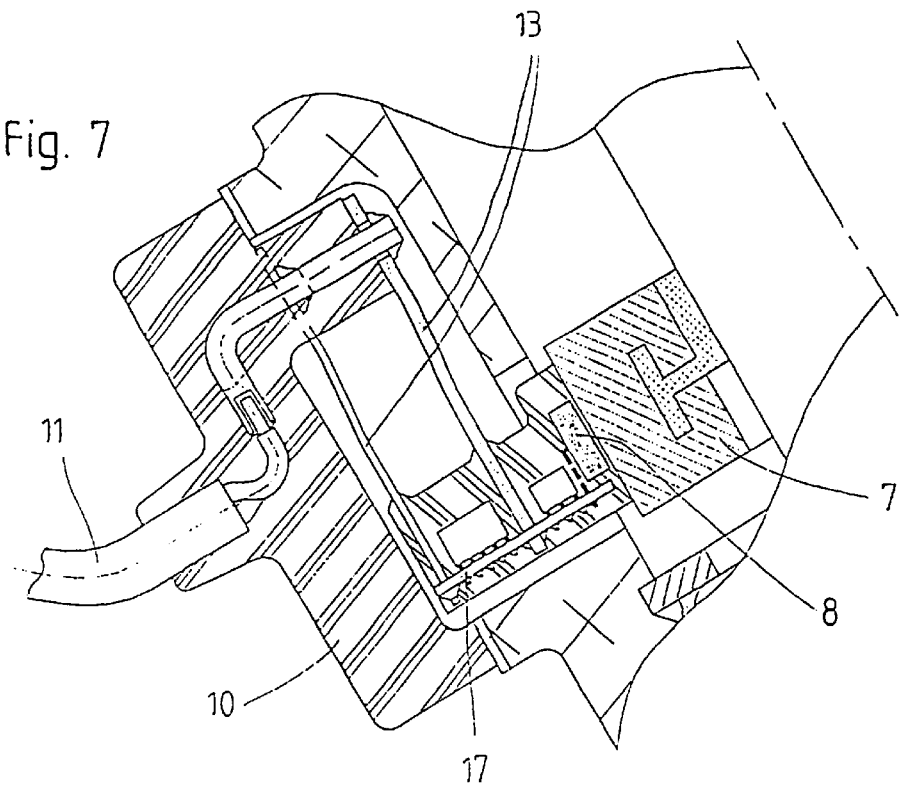
Figure 8:
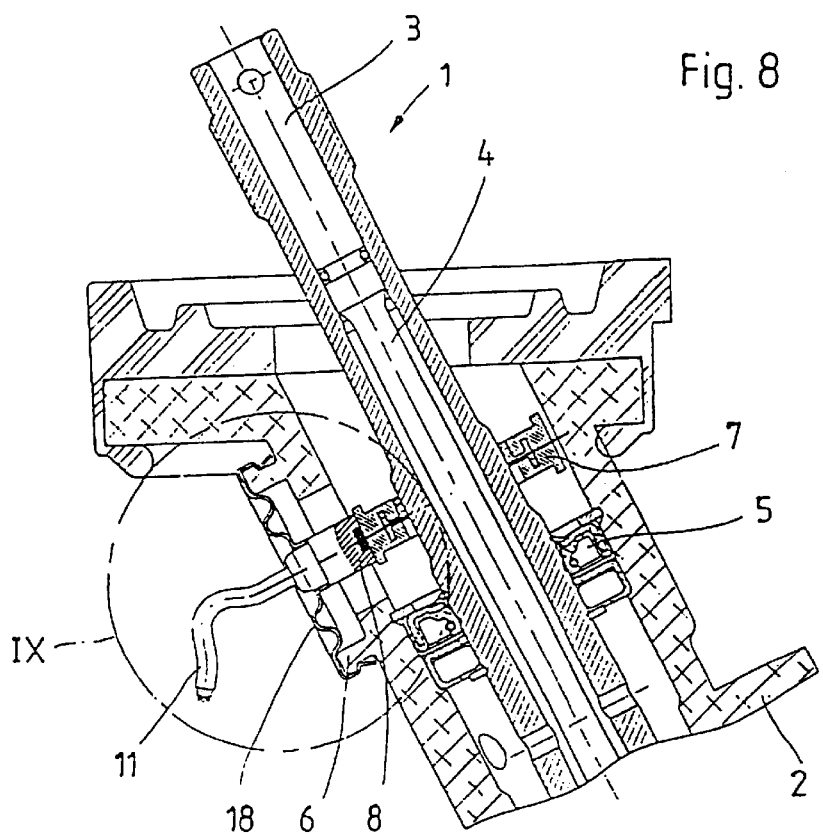
Figure 9:
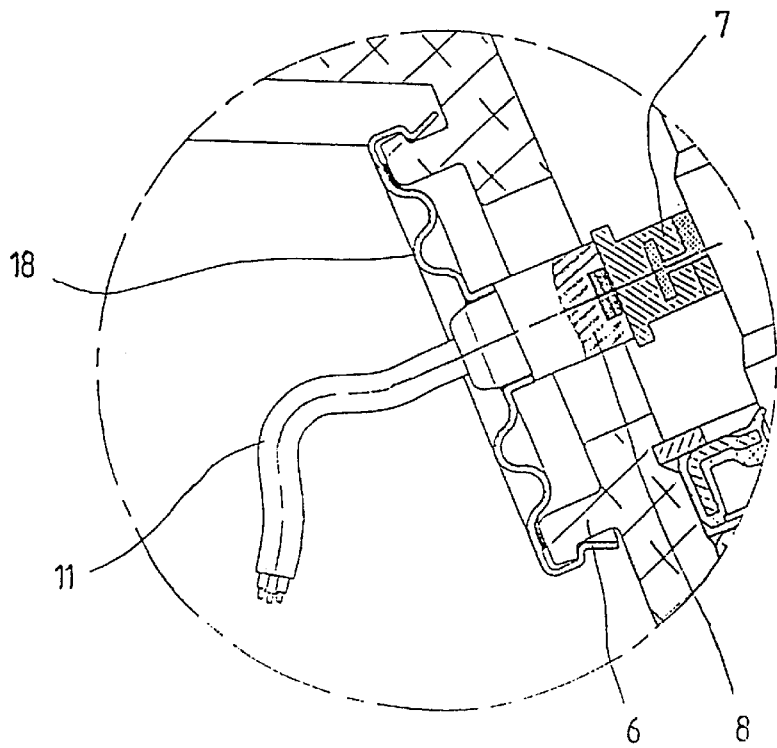

Additional advantages and characteristics of the invention are disclosed in the following description of the figures. The figures show:

FIG. 1, a sectioned representation of part of a steering gear;

FIG. 2, a sectional representation along line II—II in FIG. 1;

FIG. 3, the detail III of FIG. 1;

FIG. 4, a sectional representation according to FIG. 1 of an alternative embodiment;

FIG. 5, a sectional representation along line V—V in FIG. 4;

FIG. 6, a detail according to FIG. 3 of an additional alternative embodiment;

FIG. 7, a detail according to FIG. 3 of an additional alternative embodiment;

FIG. 8, a sectional representation according to FIG. 1 of an alternative embodiment, and FIG. 9, detail 9 of FIG. 8.

In all figures, identical elements are identified by the same reference numerals.

FIGS. 1–3 show a first embodiment of the rotary sensor arrangement according to the invention. The steering gear 1 shown in these figures contains a housing 2, into which an input shaft 3 is inserted by means of bearings/seals 5, wherein the input shaft consists of a torsion rod 4 in the embodiment shown. Steering movements are transferred onto the input shaft 3 which is directly or indirectly connected to a steering wheel of a motor vehicle, i.e., the steering movements causes the shaft to rotate.

A pulse ring 7 is attached onto the input shaft 3 such that it can be turned with the input shaft 3.

A sensor in the form of a sensor thrust piece 8 is arranged in an auxiliary housing 6 opposite to the pulse ring 7. For this purpose, a bore is formed in the housing 2. The thrust piece 8, into which sensors and, if so required, the electronics, the connecting lines and the like are cast, is pressed against the pulse ring inside of the bore arranged in the housing by means of a spring 9. A sliding layer of plastic is arranged between the sensor thrust piece 8 and the pulse ring 7, wherein said plastic layer may, for example, also be formed by a plastic thrust piece 8. In the embodiment according to FIGS. 1–3, a screw-type stopper 10 is screwed into the opening of the auxiliary housing 6 which is provided with internal threads in order to form an abutment for the spring and close the assembly opening. The connecting line 11 extends through the screw-type stopper 10.

The detailed representation of this arrangement that is shown in FIG. 3 indicates the Hall sensors 12 cast into the thrust piece.

An alternative embodiment is shown in FIGS. 4 and 5. However, this embodiment merely differs from the previously described embodiment with respect to certain details of the thrust piece arrangement. In the embodiment according to FIGS. 1–3, the thrust piece contains an annular groove for the spring on its side which faces away from the shaft 3. In the embodiment according to FIG. 4, the thrust piece 8 contains a pin-like projection onto which a coil spring 9 is attached. The stopper 10 is not provided with threads, but rather realized in the form of a clipped-on cover that is attached onto an annular bead on the auxiliary housing 6.

In the detailed embodiment shown in FIG. 6, the thrust piece 8 is provided with connectors that are connected to a line connector in the stopper 10. The stopper 10 does not contain threads or a clip, but is inserted into the auxiliary housing 6 with the thrust piece 8 and fixed by means of a clipped-on cap 15 with a clamping ring 16. The thrust pieces are realized in the form of parallel, elastic guides for the sensor and simultaneously form the electric connecting elements.

In the detailed embodiment shown in FIG. 7, one can clearly ascertain the elastic guide elements arranged in the form of a parallelogram. The flat spring elements also serve for the electrical connection with the electronic 17 cast into the thrust piece together with the Hall sensor 8. In the embodiment shown, the stopper 10 is attached from the top and, for example, bonded to the housing. Alternatively or additionally, it would also be conceivable to realize the pulse ring 7 in radially elastic fashion. Due to the parallelogram-like guidance of the thrust piece, a guide and additional elastic elements can be eliminated.

In the embodiment shown in FIGS. 8 and 9, the spring functions, the guide function and the housing seal are realized by means of a membrane cap 18. The thrust piece 8 is guided and spring-mounted by the elastic cap 18 that is attached onto an annular bead of the housing similar to a clip.

The embodiments shown only serve to elucidate the invention, and in the invention is not limited thereby. The sensor arrangement can be installed or removed very easily and entirely independently of the state of installation of the input shaft 3. Since the air gaps between the sensor and the pulse ring required in the state of the art are replaced with a plastic layer, according to the invention the distance between the pulse ring and the sensor always remains the same entirely independently of manufacturing tolerances, alignment errors, untrue running and possible deflections of the shaft. In addition, a shaft deflection has no influence on the behavior of the sensor, such that it is also possible to realize high-resolution sensors. Until now, this was only possible in ball bearing arrangements.

LIST OF REFERENCE NUMERALS

1 Steering valve/steering gear
2 housing
3 input shaft
4 torsion rod
5 bearing/seal
6 auxiliary housing
7 pulse ring
8 sensor thrust piece
9 spring
10 stopper
11 line
12 hall sensor
13 connections
14 line connector
15 cap
16 ring
17 electronic
18 membrane cap

What is claimed is:

1. A rotary sensor for sensing rotation of a rotatable element relative to a surrounding stationary element, said sensor comprising:

a first sensor unit arranged on the rotatable element;

a second sensor unit arranged on the stationary element, said second sensor unit being accessed and being removable from said stationary element independently of the state of installation of said first sensor unit, said first sensor unit and said second sensor unit being slidable on one another upon rotation of said first sensor unit; and a biasing mechanism biasing said first and second sensor units together, said first and second sensor units being constructed to compensate for axial tolerances between said first and second sensor units;

said second sensor unit arranged on the stationary element being arranged in a plastic thrust piece.

2. The rotary sensor according to claim 1 wherein a plastic layer is arranged between said first and second sensor units.

3. The rotary sensor according to claim 1 wherein said first sensor unit mounted on the rotatable element is an annular sensor unit.

4. The rotary sensor according to claim 1 wherein said first sensor unit arranged on the rotatable element is a magnetic pulse sensor unit.

5. The rotary sensor according to claim 1 wherein said second sensor unit arranged on the stationary element is in the shape of a ring segment.

6. The rotary sensor according to claim 1 wherein said second sensor unit arranged on the stationary element contains Hall sensors.

7. The rotary sensor according to claim 1 wherein said first and second sensor units, and evaluation circuits and connecting lines are cast into the plastic thrust piece.

8. The rotary sensor according to claim 1 wherein said second sensor unit arranged on the stationary element is arranged in an auxiliary housing by means of a screwed-on cover.

9. The rotary sensor according to claim 1 wherein said second sensor unit arranged on the stationary element is arranged in an auxiliary housing by means of a clipped-on cover.

10. The rotary sensor according to claim 1 wherein said first and second sensor units are positioned by means of a parallel, elastic guide.

11. The rotary sensor according to claim 10 wherein elements of the parallel, elastic guide also form electrical connection elements.

12. The rotary sensor according to claim 1 wherein said rotary sensor is arranged on a steering gear.

13. The rotary sensor according to claim 12 wherein said first sensor unit is annular and is arranged on an input shaft of a steering valve, and said second sensor unit is arranged in a housing bore of a housing of the steering gear.

14. The rotary sensor according to claim 13 wherein at lease one of said first and second sensor units is integral with the shaft.

15. The rotary sensor according to claim 13 wherein at least one the said first and second sensor units is integral with the housing of the steering gear.

16. The rotary sensor according to claim 1 wherein compensation of axial tolerances is achieved by said first and second sensor units being of different axial lengths.

17. A rotary sensor for sensing rotation of a rotatable element relative to a surrounding stationary element, said sensor comprising:

a first sensor unit arranged on the rotatable element;

a second sensor unit arranged on the stationary element, said second sensor unit being accessed and being removable from said stationary element independently of the state of installation of said first sensor unit, said first sensor unit and said second sensor unit being slidable on one another upon rotation of said first sensor unit; and a biasing mechanism biasing said first and second sensor units together, said first and second sensor units being constructed to compensate for axial tolerances between said first and second sensor units;

said first and second sensor units being positioned by means of a parallel, elastic guide.

18. The rotary sensor according to claim 17 wherein elements of the parallel, elastic guide also form electrical connection elements.

* * * * *